Aug. 26, 1958  D. R. P. JACKSON  2,849,233
APPARATUS FOR FEEDING SHEETS
Filed June 7, 1955  6 Sheets-Sheet 1

INVENTOR
DONALD R.P. JACKSON

BY Watson, Cole, Grindle +
Watson
ATTORNEYS

Aug. 26, 1958     D. R. P. JACKSON     2,849,233
APPARATUS FOR FEEDING SHEETS
Filed June 7, 1955     6 Sheets-Sheet 3

INVENTOR
DONALD R.P. JACKSON
BY
Watson, Cole, Grindle + Watson
ATTORNEYS

Aug. 26, 1958

D. R. P. JACKSON 2,849,233

APPARATUS FOR FEEDING SHEETS

Filed June 7, 1955

INVENTOR
Donald R.P. Jackson
BY
Watson Cole Grindle + Watson
ATTORNEYS

Aug. 26, 1958  D. R. P. JACKSON  2,849,233
APPARATUS FOR FEEDING SHEETS
Filed June 7, 1955  6 Sheets—Sheet 5

INVENTOR
DONALD R.P. JACKSON
BY
Watson, Cole, Grindle & Watson
ATTORNEYS

United States Patent Office 2,849,233
Patented Aug. 26, 1958

2,849,233

APPARATUS FOR FEEDING SHEETS

Donald Richard Patrick Jackson, Deptford, London, England, assignor to Molins Machine Company, Limited, London, England, a British company Application June 7, 1955, Serial No. 513,887

Claims priority, application Great Britain June 9, 1954

4 Claims. (Cl. 271—43)

This invention concerns improvements in or relating to apparatus for feeding sheets, for example sheets of board, which require to be fed singly from a pile, for delivery to other apparatus such as apparatus which cuts, slits and creases the sheets to form blanks for packets.

According to the present invention there is provided sheet-feeding apparatus, comprising a support for a pile of sheets, a feed member arranged to rest on the top sheet of the pile near the rear edge thereof, a pushing element arranged to engage the upper surface of said top sheet and move it forwardly so that its rear edge passes beneath the feed member, the feed member being arranged thereafter to move forwardly and engage the said rear edge to push the said sheet forwardly, and means to move the said support upwardly so as to raise the pile as successive sheets are fed therefrom.

The feed member may comprise a thin tooth capable of moving under the said rear edge. The pushing element may comprise one or more needle-like projections to engage the sheet.

In order to regulate the feed of sheets from the pile, there may be provided, adjacent the front edge of the pile, a gate comprising an upper element arranged to rest on the top sheet of the pile and a lower element suitably spaced apart from the upper element to permit only a desired number of sheets (e. g. one sheet) to pass between the said elements at each feeding stroke, the gate being freely movable up and down to allow for slight variations in the height of the pile as feeding proceeds. The space between the upper and lower element may be adjustable for different thicknesses of sheet. The gate may comprise an abutment arranged to move rearwardly against the front edges of sheets in the upper part of the pile after each feeding stroke, and then to move forwardly, so as to maintain a clearance between said lower element and the said sheets.

The said support for the pile may comprise a vertically movable platform adapted to receive a removable tray on its upper surface, and capable of being moved down to a level at which it is flush with a fixed platform adapted to receive a further tray, whereby such further tray, carrying a pile of sheets, can be pushed from the fixed platform on to the movable platform. Side guides may be provided for the pile on the vertically movable platform. A lateral pusher device may be provided for aligning laterally the sheets in the said pile, said device comprising a pusher arranged periodically to engage and push against the edges at one side of the upper sheets in the pile so as to push said sheets against an abutment (e. g. a side guide).

The said means to move the support upwardly may comprise detector-means to detect the height of the pile of sheets and arranged automatically to interrupt the upward movement of the support, so as to maintain the height of the pile within predetermined limits. The said detector means may comprise an element arranged to rest on the top sheet of the pile, and control means responsive to movements of said element to cause the upward movement of the pile to be stopped and restarted.

The means to move the platform upwardly may comprise a pawl and ratchet device, the said control means including a device capable of moving said pawl out of engagement with said ratchet to stop the upward movement of the drum.

Means may be provided to vary the rate at which the support is moved upwardly, in relation to the operation of said feed member and said pushing element, said means including an expanding pulley. The said expanding pulley may comprise a pair of conical-faced elements mounted on a shaft, one being movable along said shaft towards and away from the other, the said elements having spaced recesses on their conical faces, the recesses on one element being staggered in relation to those on the other element so as to enable the two elements to intermesh.

Further according to the invention there is provided an expanding pulley comprising a pair of conical-faced elements mounted on a shaft, one being movable along said shaft towards and away from the other, the said elements having spaced recesses on their conical faces, the recesses on one element being staggered in relation to those on the other element so as to enable the two elements to intermesh.

Apparatus according to the invention will now be described by way of example with reference to the accompanying drawings, in which.

Figure 1:
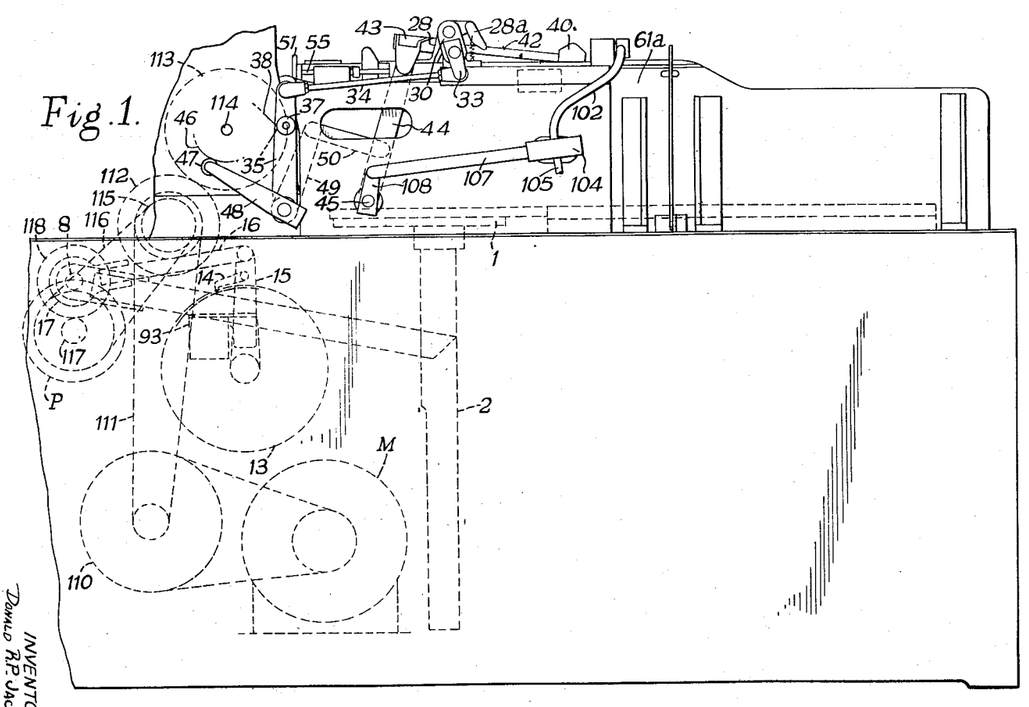
Figure 1 is a diagrammatic side elevation of the apparatus.
Figure 2:
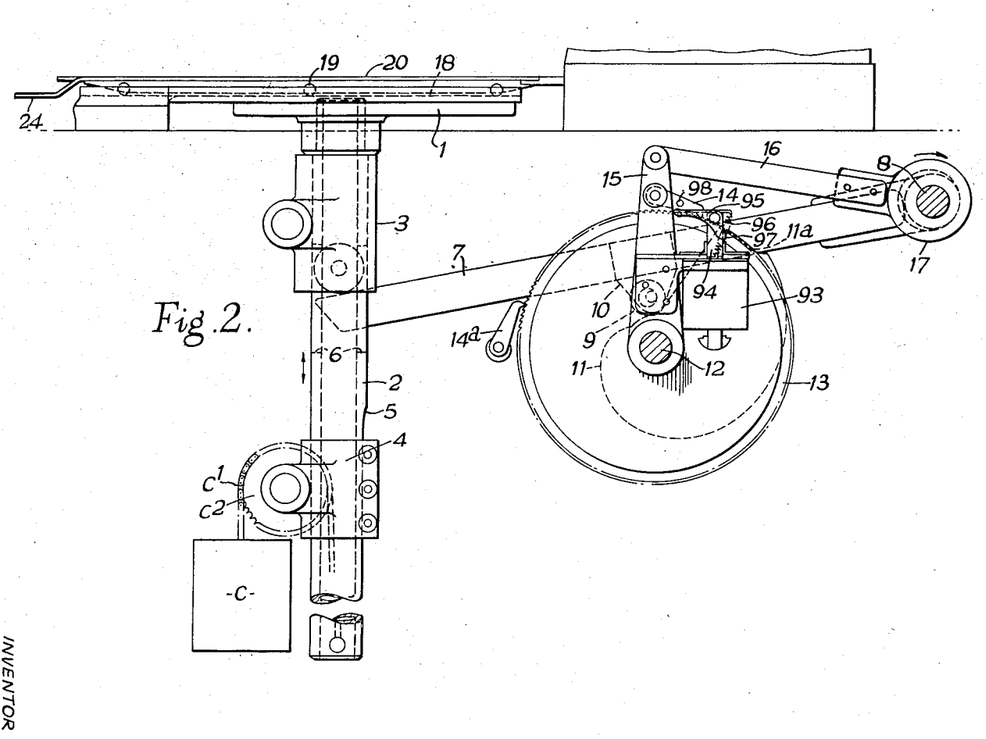
Figure 2 is a side elevation showing a platform for a pile of sheets and means for moving it upwardly.

Referring first to Figures 1 and 2, the platform 1 is carried on a vertical hollow post 2 which is slidable up and down in bearings 3 and 4. At the lower end of the post a flat 5 is formed to prevent twisting of the post. The post has a slot 6 to accommodate an end of a lever 7 which is freely pivoted on a shaft 8. A cam roller 9 mounted on an extension 10 of the lever 7 rides on the edge of a cam 11 carried on a shaft 12. The shaft 12 also carries a ratchet wheel 13 whose teeth are engaged by a pawl 14 pivoted on an arm 15 which is pivotally mounted to rock about the shaft 12. A check pawl 14a is provided to prevent reverse movement of the ratchet wheel. A rod 16 pivotally connects the arm 15 to an eccentric 17 on the shaft 8, whereby on rotation of the shaft 8 the arm 15 is rocked to and fro and the pawl 14 imparts intermittent movement to the ratchet wheel 13, and thus to the cam 11, in order to cause the lever 7 to move the post 2 gradually upwardly.

Figures 3, 4:
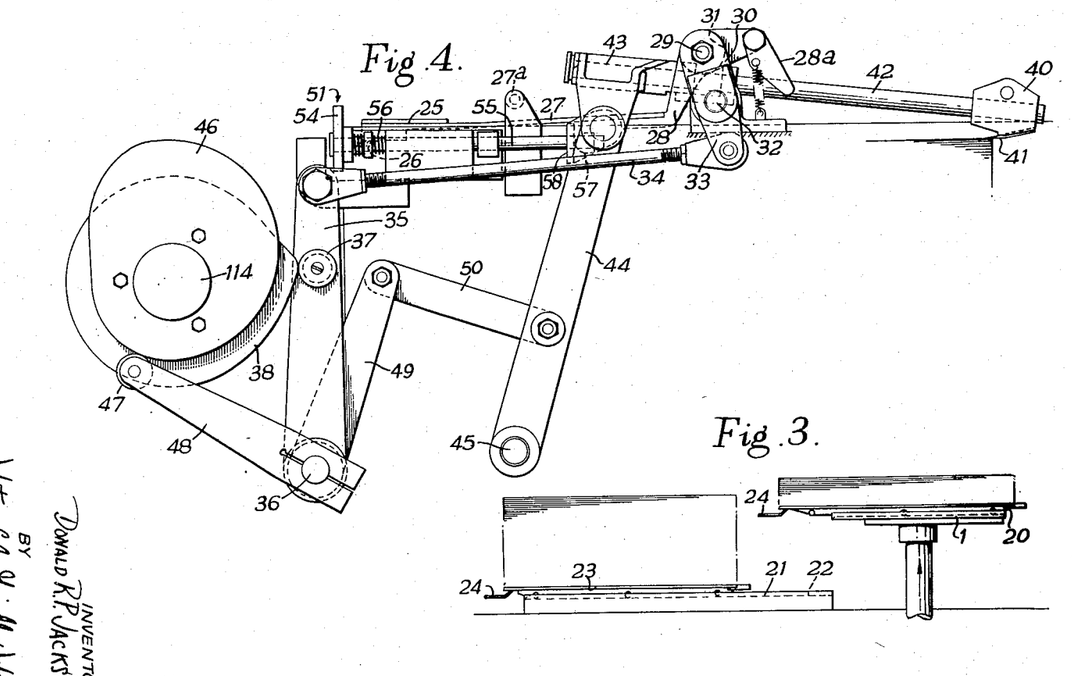
Figure 3 shows diagrammatically the movable platform shown in Figure 2, and a fixed platform behind it.
Figure 4 is a side elevation, to a larger scale, of part of the apparatus shown in Figure 1.

The platform 1 has guide rails 18 which support wheels or rollers 19 on a tray 20. The tray is for the purpose of holding a pile of sheets. In Figure 3 the tray 20 is shown carrying a partly depleted pile of sheets, the platform 1 being shown in a raised position, whereas in Figure 2 it is in its lowest position. Figure 3 also shows a fixed platform 21 which is flush with the platform 1 when the latter is at its lowest position. The platform 21 also has guide rails 22 which support a further wheeled tray 23, which in Figure 3 is shown supporting a further pile of sheets. When the platform 1 is brought down to its lowest position, the tray 23 can be pushed along the guide rails on to the platform 1, the tray 20 having previously been removed. Handles 24 are provided on the trays for easy handling.

A handwheel (not shown) is provided for turning the shaft 12, Figure 2, by hand in order to bring the platform 1 up to a suitable level before feeding of the sheets begins, the level required depending on the height of the pile of sheets on the tray. If desired the handwheel can also be used to lower the platform quickly after all the sheets of a pile have been fed. A counterweight C is provided to check the fall of the platform and post 2, the counterweight being connected to the post 2 by a chain C1 passing over a sprocket C2 which is mounted on an extension of the bearing 4. The cam 11 just beyond its highest point fails slightly to a dwell 11a by which the platform is maintained for a short time at a level just below its uppermost level, before descending to its lowest position.

Figure 5:
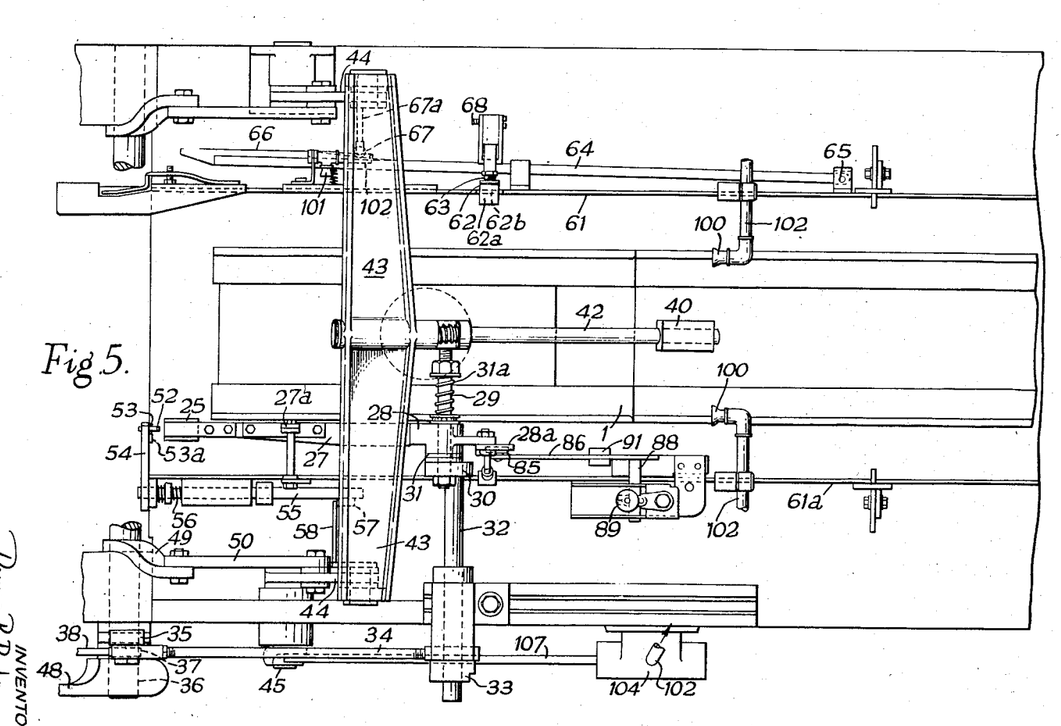
Figure 5 is a plan of part of Figure 4.

Mechanism for feeding sheets from the top of a pile is illustrated in Figure 1 and in greater detail in Figures 4 and 5. A pushing element 25 consisting of a needle pad having downwardly and forwardly inclined needles 26, whose points are arranged to engage the top sheet of the pile near its forward edge, is carried by a rod 27 fixed to a lever 28. The lever 28 is freely mounted on a pin 29 on which is fixed a link 30, and between the lever 28 and link 30 is a friction disc or washer 31. A compression spring 31a (see Figure 5) urges the lever 28, link 30, and friction disc 31 into close contact with the result that the lever 28 rocks with the link 30 unless the lever meets with resistance sufficient to overcome the friction of the disc 31. The lever 28 has a pivoted tail 28a connected by a spring as shown to a fixed part of the machine. The tail can be swung counterclockwise, as viewed in Figure 4, over the centre of the spring to a position at which the spring is tensioned, locking the tail in that position, and thus pulls the lever 28 in a clockwise direction as viewed in Figure 4. This is for the purpose of keeping the needle pad of the pushing element 25 above the level of the pile when desired. During normal feeding operations the tail 28a is in the position shown. A roller 27a is arranged a short distance above the rod 27 to limit its upward movement.

The lower end of the link 30 is fixed on one end of a shaft 32 to whose other end is fixed a short lever 33 pivoted on one end of a rod 34, whose other end is pivoted on the upper end of a swinging arm 35 arranged to rock freely about a pin 36. The arm 35 carries a cam roller 37 which is urged by a spring (not shown) into engagement with the edge of a cam 38.

A feed member consisting of a pusher 40 with a thin blade-like tooth 41 is mounted on one end of a rod 42, whose other end is fixed to a rocking cross-bar 43 which extends across the pile of sheets and is pivotally mounted at both ends on a pair of swinging arms 44, one of which is visible in Figure 4 while both are seen in Figure 5. The arms 44 are fixed on rock-shafts 45 and are arranged to be rocked by a cam 46 acting on a cam roller 47 (see Figure 4) on a lever 48 fixed on the pin 36, to which is also fixed a lever 49 which is connected to the arm 44 by a link 50.

The tooth 41 of the pusher 40 is arranged to rest on the top sheet of a pile near the rear edge, and as the cross-bar 43 is freely pivoted on the arms 44, the pusher 40 tends to fall downwardly. To prevent undue downward movement of the pusher at times when there are no sheets beneath it, as when the platform has been lowered to receive a new pile, a roller (not shown) is fixed to an extension of the cross-bar above a fixed track which is a little below the level of the top of a pile of sheets in normal feeding position. Thus when sheets are being fed the roller does not touch the track, but only engages it when no sheets are present, or when the top of the pile is below its proper feeding level. Thus during feeding the tooth 41 rests freely on the top sheet.

The cams 38 and 46 are arranged to be rotated together, and are so timed as to cause the pushing element 25 to move a short distance forwardly before the pusher 40 of the feed member starts to move forwardly (i. e. to the left as viewed in Figure 4).

Figures 6, 7:
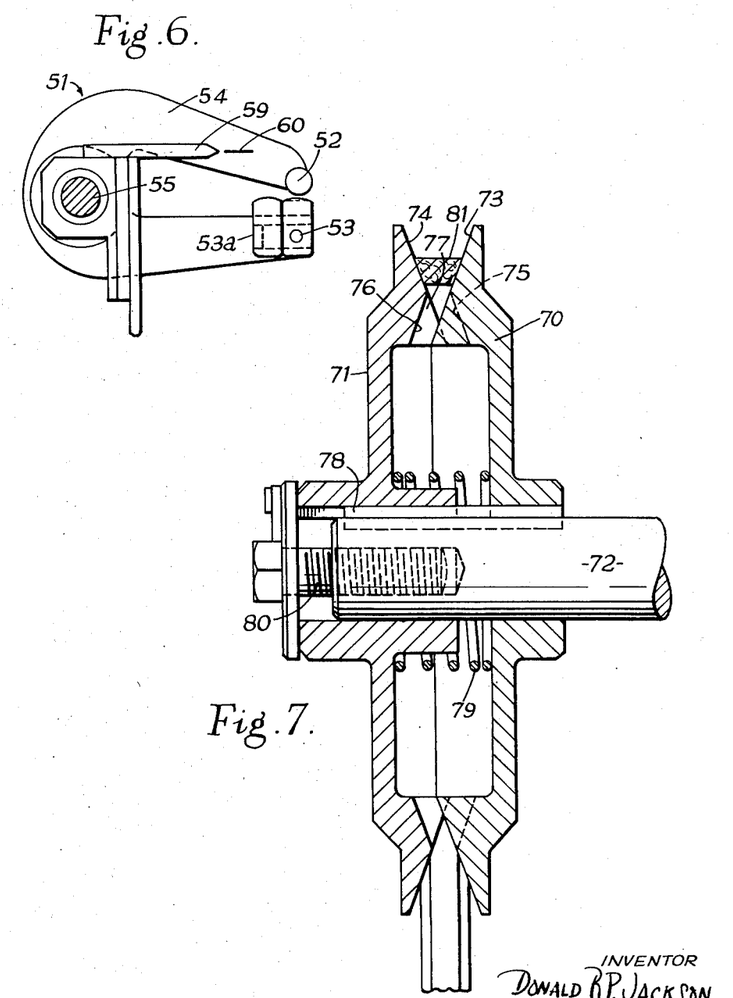
Figure 6 shows a gate for regulating the feed of sheets from the pile.
Figure 7 shows an expanding V pulley used for varying the relative speeds of certain of the parts.

In Figure 6 is illustrated a gate, also shown in Figure 5, and indicated in Figure 4 by the reference 51, which is for the purpose of regulating the feed of sheets from the pile so as to permit only one sheet at a time to be fed forwardly. The gate comprises an upper element consisting of a pin 52 and a lower element 53 which are fixed on a forked member 54. The member 54 is pivoted on a pin 55 about which it is freely swingable, the pin 55 being mounted at a position just beside the pile of sheets such that the pin 52 can rest on the top sheet of the pile while beside the lower element 53, see Figure 6, is an abutment 53a having a face slightly in advance of the part 53, and arranged to engage the front edges of the sheets in the upper part of the pile. The pin 52 is spaced from the element 53 by a distance a little greater than the thickness of a sheet to be fed between them. The pin is preferably made eccentric so that by rotating the pin the space can be adjusted as required for different thicknesses of sheet.

The pin 55 is slidable lengthwise, being urged forwardly by a compression spring 56 (Figures 4 and 5) to a position at which the abutment 53a is clear of the front edges of the sheets, although the pin 52, which extends rearwardly beyond the abutment, still rests on the top of the pile. The pin 55 has a projection 57 which is positioned to be engaged by an extension 58 on the cross-bar 43 as the arms 44 approach the end of their rearward movement (i. e. towards the right as viewed in Figures 4 and 5). This causes the pin 55 and member 54 to be pulled rearwardly so as to press the abutment 53a against the front edges of the upper sheets in the pile and thus push back any which may have moved slightly forward.

A fixed pointer 59 is provided adjacent the member 54 (see Figure 6), and a line 60 is engraved in the surface of the member 54. This is to enable the machine attendant to ascertain that a pile of sheets has been brought to the correct height for feeding, since the pin 52, as already mentioned, rests on the top sheet of the pile, and as the member 54 is freely pivoted it can swing as the pin 52 is pushed up or lowered by the sheets. When the pointer 59 registers with the line 60 the pile is at the correct height for feeding.

Side guides, indicated by the references 61 and 61a, Figure 5, are provided at the sides of the platform 1 and the pile of sheets carried thereby. In Figure 5 is shown a pusher device for laterally aligning the upper sheets of the pile by periodically pushing against their side edges so as to locate them against the opposite side guide, which for this purpose constitutes an abutment for aligning the sheets. The device comprises a pusher 62 carried by a pin 63 on which it can twist freely. The pin 63 is mounted on a swinging arm 64 pivoted at 65, which arm has a cam surface 66 positioned to be engaged by a roller 67 carried by an extension 67a on one of the arms 44. As the latter moves forwardly (i. e. to the left in Figure 5), the roller 67 engages the cam surface on the arm 64 and thereby pushes the arm inwardly. The pusher 62 is arranged to engage the edges of a few of the upper sheets in the pile, and as the arm 64 is swung inwardly the sheets are thereby pushed against the opposite side guide and are thus aligned laterally. The pusher 62 has an upper extending part 62a which lies on the top sheet of the pile, while the lower part 62b engages the edges of the sheet. The pin 63 is freely pivoted at 68 for up and down swinging movement, so that the upper part 62a of the pusher can rest freely on the top of the pile, and the pusher is freely pivoted in the pin 63 so as to be able to twist freely to ensure that the pusher is free to assume a horizontal position so that the whole of the part 62b is in engagement with edges of sheets.

The shaft 8 of the eccentric 17 by which the platform is raised, and the cams 38 and 46 which operate the elements 25 and 40 for feeding the sheets forwardly, are driven from an electric motor M, Figure 1. Since it may at times be desired to feed sheets of a different thickness from those which have previously been fed, it is necessary to be able to vary the speed of the shaft 8 relatively to that of the cams 38 and 46, since, for example, a pile of thicker sheets will need to be fed upwardly at a greater speed than a pile of thin sheets, assuming that the sheets are fed forwardly at the same speed in each case. For this purpose an expanding V pulley P, illustrated in detail in Figure 7, is employed. This comprises two coned elements 70 and 71 mounted on a shaft 72 and provided with conical faces 73, 74 which co-operate to form the V pulley. These faces have recesses 75, 76 spaced apart around the inner circumferences of the elements 70 and 71, the recesses on the element 70 being staggered in relation to those on the element 71 so that the two elements can intermesh as shown in Figure 7, parts such as 77 entering into recesses such as 75.

The element 70 is fixed on the shaft 72, and the element 71 is slidable on the shaft, but prevented from rotation relative to the shaft by a key 78. A spring 79 urges the elements apart, and the element 71 can be moved towards and away from the element 70 by means of a screw 80 extending into the shaft. A belt 81 is shaped to fit the angles of the coned elements as shown.

It is, however, sometimes found that a pile of sheets is not uniformly stacked—that is, some of the sheets may be closer to each other than others—and thus even though all the sheets are of the same thickness, the height of the pile when fed up as described is found to vary somewhat. In these circumstances, it may become impossible, by means of the apparatus so far described, to feed the pile upwardly in such a way as to keep the topmost sheet at the desired feeding level, since the operation of the ratchet 13 to raise the platform 1 will have been determined (by means of the variable speed pulley just described) on the assumption that all the sheets in the pile are uniformly stacked with the same number of sheets per inch throughout. Accordingly, means are provided to control the upward movements of the platform automatically in relation to the height of the topmost sheet of the pile at any instant.

For this purpose a roller 85 (Figures 5 and 8) is arranged to rest on the topmost sheet of the pile, and is mounted on an arm 86 which is freely pivoted at 87 so that the roller can rise and fall with the pile of sheets. An extension 88 of the arm 86 carries an adjustable screw 89 adapted to operate an electric micro-switch 90 on movement of the arm 86. Thus if the arm 86 swings up a predetermined amount from a desired position, due to a rise in the height of the topmost sheet on which the roller 85 rests, the switch is closed.

Figure 8:
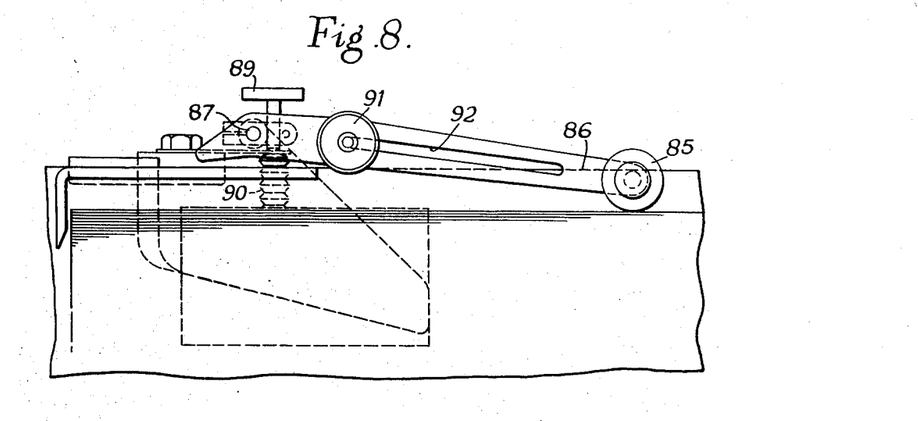
Figures 8 and 9 show details of the apparatus.

A weight 91 can be moved along a slot 92 in the arm 86 to various positions in order to adjust the effective weight of the roller bearing on the top sheet, so as on the one hand to ensure that the roller will fall when free to do so, while on the other hand avoiding undue pressure on the topmost sheet which might make it difficult to slide the latter over the sheet below it.

The micro-switch is electrically connected to a solenoid 93 (see Figure 2) whose plunger 94 has pivoted thereon a pusher 95 which is spring-urged about its pivot by a spring 96. A lip 97 on the pivoted pusher bears against an edge of the plunger 94 so as to prevent the pusher from being swung too far upwardly by the spring.

The pusher 95 is adapted to engage a pin 98 on the pawl 14 when the plunger of the solenoid moves upward, and thereby to lift the pawl away from the ratchet wheel 13. The reason for pivoting the pusher 95 is to enable it to yield if it should be lifted against the pawl 14 at a moment when the pawl is in engagement with a ratchet tooth on a forward stroke, in which event the spring pressure urges the pusher to lift the pawl 14 as soon as the pawl starts its return stroke.

Whenever the detector roller 85 (Figure 8) is raised high enough to close the micro-switch 90, the solenoid 93 is energised and the plunger 94 raises the pusher 95 which lifts the pawl 14 off the ratchet 13, and holds it out of engagement with the ratchet as long as the solenoid is energised. Thus closing of the micro-switch by the detector roller 85 causes the upward feed of the platform 1 to cease, and the platform remains stationary until the roller 85 falls to a level at which the micro-switch is again opened, whereupon the solenoid plunger 94 is retracted and the pawl 14 can again engage the ratchet teeth.

To allow for differences in sheet thickness, therefore, the drive for the shaft 8 is arranged (by suitably adjusting the variable speed pulley described above) so as to cause the platform 1 to be fed upwardly a little faster than would be desired for feeding sheets if all the sheets in the pile were in fact evenly stacked therein. After some time, the topmost sheet in the pile will be at a higher level than is desired, and the detector roller 85, which rises with the pile of sheets, lifts the arm 86 whereby the micro-switch is closed and the solenoid energised. This results in the cessation of upward movement of the platform 1 as just described, and the platform remains at the same level until a few sheets have been fed from the top of the pile, whereupon the micro-switch is opened and upward movement of the platform 1 is resumed.

Figure 9:
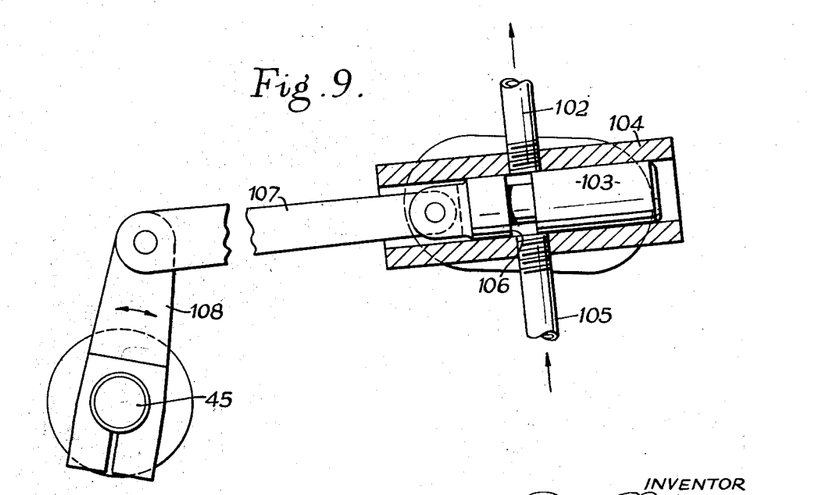

It is sometimes found, for example when heavily embossed sheets are being fed, that there is a tendency for the sheets to resist sliding movement relatively to each other, due for example to interlocking of the embossed parts of two adjacent sheets. To overcome this tendency and to enable the needles 26 and the pusher 40 to slide the top sheet over the one beneath it, air jets are directed against the upper side edges of the pile of sheets in order to loosen them and separate the top sheet slightly from the next. Two nozzles 100 (see Figure 5) are arranged at the rear end of the pile and a nozzle 101 is located at one side of the pile near the front edge. These nozzles are connected by pipes 102, through a valve, to a suitable pump or other convenient arrangement for supplying air under pressure. The valve is illustrated in Figure 9, and comprises a piston 103 slidable in a chamber 104 through which air under pressure can pass from a pipe 105 to the main pipe 102. The piston is cut away at 106 as shown, so as to permit air to pass through the chamber when the cutaway part is in register with the two pipes.

The purpose of this arrangement is to supply air through the nozzles only at a time when the pusher 40 is in its rearmost position preparatory to feeding a sheet from the top of the pile, and to cut off the air supply as soon as the pusher starts its feeding stroke. The piston 103 is mounted on a rod 107 pivoted on the end of an arm 108 which is fixed on one of the shafts 45 on which one of the arms 44 is also mounted. Thus the piston 103 moves to and fro in timed relationship with the arms 44 and thus with the pusher 40. The parts are so arranged that the cut away part of the piston registers with the inlet and outlet pipes when the pusher 40 is at its rearmost position. As explained above, the element 25 carrying the needles 26 makes its forward stroke just before the pusher 40 starts to move forwardly. Thus the air jets, which start to blow against the edges of the sheets as soon as the pusher 40 reaches its rearmost position at the end of a return stroke, continue to act while the needles 26 push the top sheet slightly forward. As soon as the pusher 40 starts to move forward the air is cut off.

As pointed out above, the shaft 8 of the eccentric 17 by which the platform is raised, and the cams 38 and 46 which operate the elements 25 and 40 for feeding the sheets forwardly, are driven from an electric motor M. Figure 1 shows diagrammatically the drive for these parts. The motor M drives a pulley 110, which by a chain 111 drives a gear wheel 112 which meshes with a gear 113 fixed on a shaft 114 on which the cams 38 and 46 are mounted. A pulley 115 which rotates with the gear 112 drives a belt 116 by which the expanding V pulley P is driven. A small gear wheel 117 on the shaft of the expanding pulley P drives a gear 118 on the shaft 8 which carries the eccentric 17. Thus adjustment of the expanding pulley P varies the speed of the shaft 8 relatively to that of the cams 38 and 46, and thereby varies the speed at which the sheets are fed upwardly, in relation to the timing of the elements 25 and 40 which feed successive sheets forwardly from the pile.

The operation of the apparatus is as follows.

Assuming that all the sheets of a pile have been fed from it and the tray 20 is empty, the platform having reached its highest position, the roller 9 falls on to the dwell 11a on the cam 11 and the platform is thus lowered slightly. It remains at this lowered position long enough to enable an attendant to remove the empty tray 20, and thereafter falls to its lowest position as shown in Figure 1.

A further tray 23 (Figure 3), has in the meantime been filled with sheets, and when the empty tray 20 has been removed, and the platform 1 brought to its lowest position, the tray 23 is pushed from the platform 21 on to the platform 1. The empty tray 20 can then be placed on the fixed platform 21 and further sheets piled on it at some convenient time.

The shaft 12 is then turned by hand to cause the platform 1 to be raised to a suitable position for feeding sheets from the pile. This position can be judged by the position of the line 60 on the swinging member 54 (Figure 6) in relation to the pointer 59, as already explained.

When the pile is in position, the tooth 41 of the feed member is resting on the top sheet of the pile near its rear edge, and the needle pad 25 of the pusher element is raised clear of the top sheet, as will shortly be explained, the feed member and the pusher element having been moved to their rearmost positions. At this time air jets are being discharged by the nozzles 100 and 101 against the edges of the uppermost sheets on the pile.

On rotation of the cams 38 and 46, the cam 38 will first cause the arm 35 to swing to the right in Figure 4, by which the lever 33, link 30, and lever 28 are all swung counterclockwise about the shaft 32, as viewed in Figure 4. The lever 28 and link 33 move as one because initially the lever 28 encounters no resistance which would overcome the friction of the disc 31. This movement swings the needle pad down towards the top sheet of the pile.

On continued movement, the needle pad engages the top sheet, and the lever 28 is thus prevented from further swinging movement and therefore slips relatively to the friction disc. The needle pad is therefore thrust forward in a horizontal direction, and its needles, projecting slightly into the top sheet, push it a short distance forward.

When the needle pad has pushed the top sheet far enough forward to move the rear edge of the sheet beneath the feed tooth 41, and the front edge through the gate, the cam 46 causes the arms 44 to start swinging to the left as viewed in Figures 1 and 4, and the tooth 41 is thus caused to move forwardly and slips under the rear edge of the top sheet, which is thus engaged and pushed forwardly by the feed pusher 40 and tooth 41. As the tooth 41 starts to move, the piston 103 cuts off the supply of air to the air jets.

When the needle pad 25 has moved forwardly to its full extent (in which position it is shown in Figure 4) it is caused, on further rotation of the cam 38, to swing up and away from the sheets. This occurs because as the link 30 is swung clockwise (as viewed in Figure 4) the lever 28 swings with it since there is no resistance to overcome the friction of the disc 31. The roller 27a engages the rod 27 as the latter moves upwardly and thereby limits its upward movement, so that during the remainder of the clockwise movement of the link 30 the lever 28 is caused to slip on the friction disc, and the arm 27 moves horizontally backward.

Continued forward movement of the feed member 40 in engagement with the rear edge of a sheet causes the front edge of the latter to be pushed still further through the gate between the members 52 and 53 to a sufficient extent that it can be gripped or held and fed forward in any suitable or convenient way by the further mechanism to which the sheets are being fed. The mechanism described herein is used for feeding sheets of board to a pair of co-operating opposed rollers which continue the feed of the sheets while operating on them to cut and crease them to form packet blanks.

As the arms 44 start to move towards their extreme forward position, which is the extreme left-hand position as viewed in Figures 1, 4 and 5, the roller 67, Figure 5, rides over the cam surface 66 and pushes the arm 64 inwardly, so that the pusher 62 pushes against the edges of the top few sheets in the pile to align them laterally as already described.

On the return stroke of the arms 44 the extension 58 engages the projection 57 on the pin 55 and pulls the pin and the member 51 rearwardly, that is, to the right in Figures 4 and 5. This causes the abutment 53 to press against the front edges of the upper sheets in the pile and push back any which may be too far advanced, for example, having been pushed forward by the top sheet as the latter is fed. This is to ensure not only that the sheets are properly disposed in the pile, but that there is a clearance between the abutment 53 and the front edges of the sheets, as will be the case as soon as the arms 44 start to move forwardly and permit the member 54 to move forwardly, as it will do under pressure of the spring. It is important to maintain this clearance in order that the pin 52 can move up or down freely with the pile, whose height varies slightly from moment to moment because the upward feed of the pile by the pawl 14 and ratchet 13 does not keep exact step with the feed of the sheets from the pile but, as explained above, is arranged to overfeed slightly and to be interrupted at times by the detector roller 85.

Feeding as just described continues until the last sheet has been fed from the tray. In the meantime the attendant will have placed a fresh supply of sheets in the receptacle on the fixed platform 21, and so when the tray on the platform 1 is empty, the cycle of operations just described can be repeated.

What I claim as my invention and desire to secure by Letters Patent is:

1. Sheet-feeding apparatus, comprising a support for a pile of sheets, a feed member comprising a thin tooth arranged to rest on the top sheet of the pile near the rear edge thereof, a pushing element arranged to engage the upper surface of said top sheet and move it forwardly so that its rear edge passes beneath the said tooth of the feed member, the feed member being arranged thereafter to move forwardly so that the said tooth moves under the said rear edge and so as to engage the said rear edge to push the said sheet forwardly, and means to move the said support upwardly so as to raise the pile as successive sheets are fed therefrom.

2. Sheet feeding apparatus comprising a support for a pile of sheets, and means to feed the top sheet of the pile forwardly from the pile, wherein there is provided, adjacent the front edge of the pile, a gate comprising an upper element arranged to rest on the top sheet of the pile and a lower element suitably spaced apart from the upper element to permit only a desired number of sheets to pass between the said elements at each feeding stroke of the feed member, the gate being freely movable up and down to allow for slight variations in the height of the pile as feeding proceeds, and comprising an abutment arranged to move rearwardly against the front edges of sheets in the upper part of the pile after each feeding stroke, and then to move forwardly, so as to maintain a clearance between said lower element and the said sheets.

3. Apparatus as claimed in claim 2, wherein the said gate comprises an eccentrically mounted pin which forms one of the said elements, the said pin being rotatable for the purpose of altering the space between the said upper and lower elements.

4. Apparatus as claimed in claim 1, wherein a lateral pusher device is provided for aligning laterally the sheets in the said pile, said device comprising a pusher arranged periodically to engage and push against the edges at one side of the upper sheets in the pile so as to push said sheets against an abutment.

References Cited in the file of this patent

UNITED STATES PATENTS

| | | |
|---|---|---|
| 679,961 | French | Aug. 6, 1901 |
| 998,733 | Aichele | July 25, 1911 |
| 1,087,533 | Freeman | Feb. 17, 1914 |
| 1,691,919 | Carroll | Nov. 20, 1928 |
| 1,842,194 | Peterson | Jan. 19, 1932 |
| 2,108,613 | Rider | Feb. 15, 1938 |
| 2,381,743 | Harred | Aug. 7, 1945 |
| 2,402,453 | Schneider | June 18, 1946 |
| 2,467,493 | Pabich | Apr. 19, 1949 |